(12) United States Patent
Yi

(10) Patent No.: US 10,157,127 B2
(45) Date of Patent: Dec. 18, 2018

(54) DATA STORAGE DEVICE AND METHOD INCLUDING SELECTING A NUMBER OF VICTIM MEMORY REGIONS FOR GARBAGE COLLECTION BASED ON ERASE COUNTS AND THE NUMBER OF CANDIDATE MEMORY REGIONS

(71) Applicant: SK hynix Inc., Gyeonggi-do (KR)

(72) Inventor: Yeong Sik Yi, Seoul (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 15/441,375

(22) Filed: Feb. 24, 2017

(65) Prior Publication Data
US 2018/0157586 A1 Jun. 7, 2018

(30) Foreign Application Priority Data
Dec. 5, 2016 (KR) ........................ 10-2016-0164549

(51) Int. Cl.
*G06F 12/02* (2006.01)
(52) U.S. Cl.
CPC .. *G06F 12/0261* (2013.01); *G06F 2212/1032* (2013.01)
(58) Field of Classification Search
CPC .................... G06F 12/0261; G06F 2212/1032
See application file for complete search history.

(56) References Cited

U.S. PATENT DOCUMENTS

| | | | |
|---|---|---|---|
| 2014/0181370 A1* | 6/2014 | Cohen | G06F 12/0246 711/103 |
| 2016/0004464 A1* | 1/2016 | Shen | G06F 3/0619 711/103 |
| 2016/0283369 A1* | 9/2016 | Hada | G06F 12/0253 |
| 2016/0335179 A1* | 11/2016 | Lee | G06F 12/0246 |

FOREIGN PATENT DOCUMENTS

KR    1020110110720    10/2011

OTHER PUBLICATIONS

Han et al, "CATA: A Garbage Collection Scheme for Flash Memory File Systems," In: Ubiquitous Intelligence and Computing (UIC) 2006, Lecture Notes in Computer Science, vol. 4159. Springer, Berlin, Heidelberg, pp. 103-112.*

* cited by examiner

*Primary Examiner* — Glenn Gossage
(74) *Attorney, Agent, or Firm* — IP & T Group LLP

(57) ABSTRACT

A data storage device and method for operating the data storage device are disclosed. The data storage device includes a memory device including a plurality of memory regions, and a controller for selecting one or more candidate memory regions among the plurality of memory regions based on erase counts of the plurality of memory regions, and determining an adjustment value based on the number of candidate memory regions. The controller selects a number of victim memory regions among the one or more candidate memory regions, and performs a garbage collection operation on the selected number of victim memory regions. The (Continued)

number of victim memory regions may be equal to or less than the adjustment value, for example. The controller may determine whether candidate memory regions exist for which garbage collection has not been performed, and may select victim memory regions depending on amounts of valid data stored therein and a number of free memory regions. The controller may also determine a mode value based on the number of free memory regions.

16 Claims, 12 Drawing Sheets

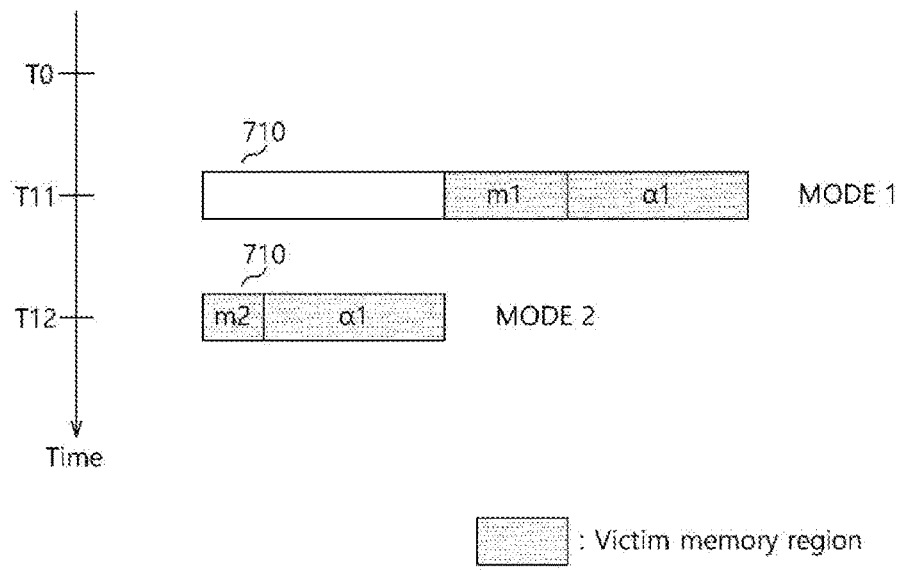

| Mode | Mode condition | Number of victim memory regions | | Management condition |
|---|---|---|---|---|
| | | Adjustment value | Mode value | |
| MODE1 | $f1 \leq f$ | α | m1 | s1 |
| MODE2 | $f2 \leq f < f1$ | α | m2 | s2 |
| MODE3 | $f3 \leq f < f2$ | α | m3 | s3 |
| MODE4 | $0 \leq f < f3$ | | - | s4 |

( $0 < f3 < f2 < f1$ , $0 < m3 < m2 < m1$ , $0 < s4 < s3 < s2 < s1$ )

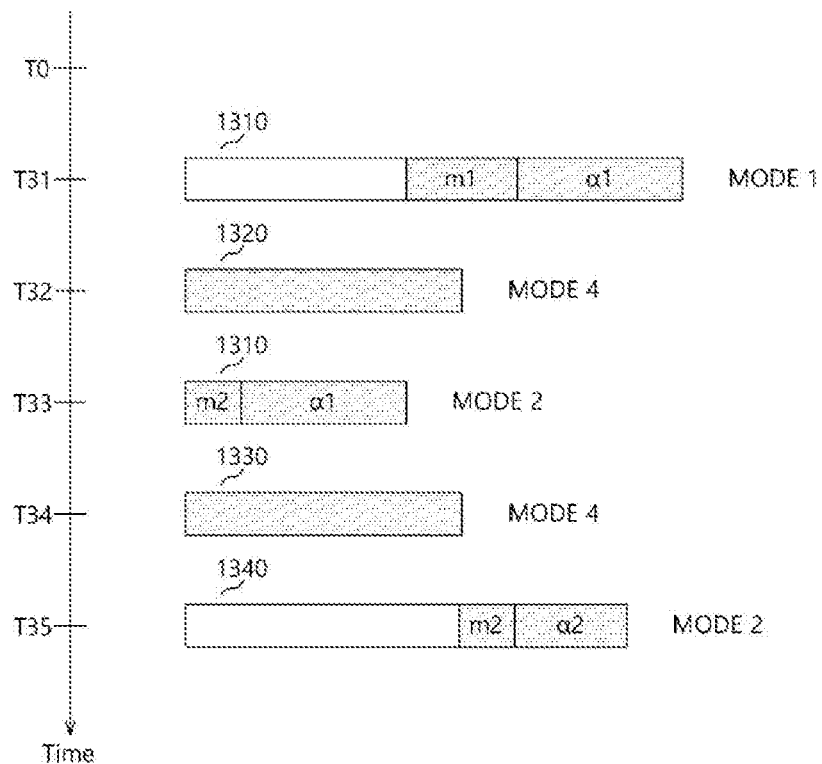

DATA STORAGE DEVICE AND METHOD INCLUDING SELECTING A NUMBER OF VICTIM MEMORY REGIONS FOR GARBAGE COLLECTION BASED ON ERASE COUNTS AND THE NUMBER OF CANDIDATE MEMORY REGIONS

CROSS-REFERENCES TO RELATED APPLICATION

The present application claims priority under 35 U.S.C. § 119(a) to Korean application number 10-2016-0164549, filed on Dec. 5, 2016, in the Korean Intellectual Property Office, which is incorporated herein by reference in its entirety.

BACKGROUND

1. Technical Field

Various embodiments generally relate to a data storage device and, more particularly, to a data storage device including a nonvolatile memory device.

2. Related Art

Data storage devices may store data provided by an external device in response to a write request. Data storage devices may also provide stored data to an external device in response to a read request. Examples of external devices that use data storage devices include desktop, portable and mobile electronic devices including computers, digital cameras, cellular phones, smart phones, smart cards, and the like. Data storage devices may be embedded in an external device during manufacturing of the external devices or may be fabricated separately and then connected afterwards to an external device.

SUMMARY

In an embodiment, a data storage device may include: a memory device including a plurality of memory regions; and a controller for selecting one or more candidate memory regions among the plurality of memory regions based on erase counts of the plurality of memory regions, determining an adjustment value based on the number of the candidate memory regions, selecting victim memory regions by the number that is equal to or less than the adjustment value among the candidate memory regions, and performing a garbage collection operation to the selected victim memory regions.

In an embodiment, a method for operating a data storage is device may include: selecting one or more candidate memory regions among a plurality of memory regions based on erase counts of the plurality of memory regions; determining an adjustment value based on the number of the candidate memory regions; selecting one or more victim memory regions by the number that is equal to or less than the adjustment value among the candidate memory regions; and performing a garbage collection operation to the victim memory regions.

BRIEF DESCRIPTION OF THE DRAWINGS

The above and other features and advantages of the present invention will become more apparent to those skilled in the art to which the present invention belongs by describing various embodiments thereof with reference to the attached drawings in which:

FIG. 6 is a table illustrating operational modes of the wear leveling operation of the memory management unit employed by the data storage device of FIG. 5.

FIG. 7 is diagram illustrating performance of a wear leveling operation of the memory management unit employed by the data storage device of FIG. 5 based on the table of FIG. 6, including illustration of candidate memory regions and victim memory regions for different modes at various times.

FIG. 12 is another table illustrating the modes of the wear leveling operation and the memory collection operation of the memory management unit employed by the data storage device of FIG. 5.

FIG. 13 is diagram illustrating performance of a wear leveling operation and the memory collection operation of the memory management unit employed by the data storage device of FIG. 5 based on the table of FIG. 12, including illustration of candidate memory regions and victim memory regions for different modes at various times.

DETAILED DESCRIPTION

Figure 1:
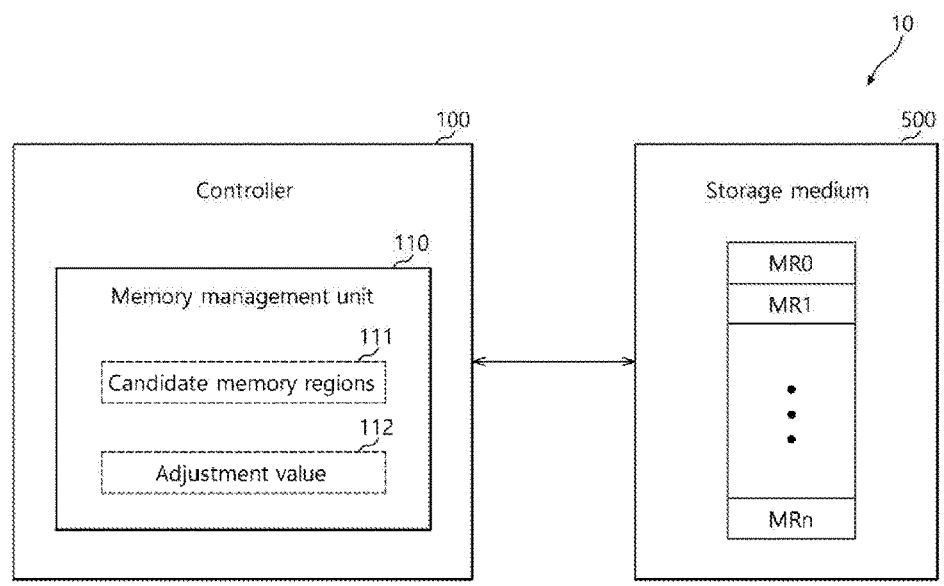
FIG. 1 is a block diagram illustrating a data storage device in accordance with an embodiment of the present invention.

Hereinafter, various exemplary embodiments of the present invention including a data storage device and an operating method thereof will be described with reference to the accompanying drawings. The present invention may, however, be embodied in different other embodiments, forms and variations thereof, and should not be construed as being limited to the embodiments set forth herein. Rather, these embodiments are provided to describe the present invention in sufficient detail to the extent that a person skilled in the art to which the invention pertains can carry out the present invention.

It is to be understood that embodiments of the present is invention are not limited to the particulars shown in the drawings, that the drawings are not necessarily to scale, and, in some instances, proportions may have been exaggerated in order to more clearly depict certain features of the invention. While particular terminology is used, it is to be appreciated that the terminology used is for describing particular embodiments only and is not intended to limit the scope of the present invention.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The phrase "at least one of . . . and . . . ," when used herein with a list of items, means a single item from the list or any combination of items in the list. For example, "at least one of A, B, and C" means, only A, or only B, or only C, or any combination of A, B, and C.

The term "or" as used herein means either one of two (or more) alternatives but not both (nor any combinations thereof).

As used herein, singular forms are intended to include the plural forms as well, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, an element (also referred to as a feature) described in connection with one embodiment may be used singly or in combination with other elements of another embodiment, unless specifically indicated otherwise.

Hereinafter, the various embodiments of the present is invention will be described in detail with reference to the attached drawings.

FIG. 1 is a block diagram illustrating a data storage device 10 in accordance with an embodiment of the present invention.

The data storage device 10 may store data provided from an external device in response to a write request from the external device. Also, the data storage device 10 may provide stored data to the external device in response to a read request from the external device.

The data storage device 10 may be prepared in the form of a Personal Computer Memory Card International Association (PCMCIA) card, a CompactFlash™ (CF) card, a SmartMedian™ (SM) card, a Memory Stick™, various multimedia cards (e.g., MultiMediaCard™ (MMC), eMMC, RS-MMC, and MMC-Micro), various secure digital cards (e.g., Secure Digital™ (SD) card, Mini-SD, and Micro-SD), a Universal Flash Storage (UFS), a Solid State Drive (SSD) and the like.

The data storage device 10 may include a controller 100 and a storage medium 500.

The controller 100 may control the data storage device 10. The controller 100 may store data in the storage medium 500 in response to a write request transmitted from an external device, and may read data stored in the storage medium 500 and output the read data to the external device in response to a read request transmitted from the external device. The controller 100 may include a memory management unit 110. The memory management unit 110 may perform various memory management operations for maintaining the is performance of the storage medium 500 and extending the lifetime of the storage medium 500. In particular, in order to evenly use a plurality of memory regions MR0 to MRn included in the storage medium 500, the memory management unit 110 may perform a wear leveling operation to candidate memory regions 111 which may be selected from the plurality of memory regions MR0 to MRn based on an adjustment value 112. In this disclosure, the candidate memory regions 111 included in the memory management unit 110 of the controller 100 is information indicating candidate memory regions among the plurality of memory regions MR0 to MRn included in the storage medium 500.

The memory management unit 110 may manage the erase counts of the plurality memory regions MR0 to MRn. Each time erasing of a memory region occurs, among the plurality of memory regions MR0 to MRn, the memory management unit 110 may increase an erase count for the erased memory region. A memory region which has a small erase count may be regarded as worn out slightly, whereas a memory region which has a large erase count may be regarded as worn out substantially.

The memory management unit 110 may select one or more candidate memory regions 111 among the plurality of memory regions MR0 to MRn based on the respective erase counts of the plurality of memory regions MR0 to MRn. For example, the memory management unit 110 may select as the candidate memory regions 111 memory regions which have relatively small erase counts among the plurality of memory regions MR0 to MRn. That is to say, the selected candidate memory regions 111 may be slightly worn out memory regions among the plurality of memory regions MR0 to MRn.

Then, the memory management unit 110 may determine the adjustment value 112 based on the number of selected candidate memory regions 111. The memory management unit 110 may determine the adjustment value 112 to increase as the number of the candidate memory regions 111 increases. For example, the memory management unit 110 may determine the adjustment value 112 to be proportional to the ratio of the candidate memory regions 111 with respect to the plurality of memory regions MR0 to MRn. In other words, as the number of the candidate memory regions 111 increases, the adjustment value 112 may also increase in a proportional manner.

Thereafter, the memory management unit 110 may select a number of victim memory regions (i.e., one or more victim memory regions) equal to or less than the adjustment value 112 among the candidate memory regions 111, and perform a garbage collection operation to the victim memory regions. During the garbage collection operation, valid data stored in the victim memory regions may be moved to free memory regions among the plurality of memory regions MR0 to MRn, thus emptying the victim memory regions and turning them into free memory regions. As a result, victim memory regions may become free memory regions to promote their use, and accordingly, the plurality of memory regions MR0 to MRn may be wear-leveled.

The garbage collection operation may be performed to the candidate memory regions 111 each time a predetermined management condition is satisfied. The number of candidate memory regions 111 which may be subjected to a single garbage collection operation may be equal to the adjustment value 112. For example, the memory management unit 110 may manage information of an accumulated size of write data. The memory management unit 110 may update the accumulated size information each time a write request is received from an external device, and perform the garbage collection operation each time the accumulated size of write data reaches a threshold size. Each time such a management condition is satisfied, the memory management unit 110 may determine whether there exist candidate memory regions 111 which are not garbage-collected yet. When candidate memory regions 111 which are not garbage-collected exist, the memory management unit 110 may repeat selecting victim memory regions by the number that is equal to or less than the adjustment value 112 among the candidate memory regions 111, and perform the garbage collection operation on the selected victim memory regions. When candidate memory regions 111 which are not garbage-collected do not exist anymore, for example, when all the candidate memory regions 111 are garbage-collected, the memory management unit 110 may select new candidate memory regions 111 based on the erase counts of the plurality of memory regions MR0 to MRn.

According to an embodiment, after performing the garbage collection operation, the memory management unit 110 may remove from the candidate memory regions 111 the victim memory regions which are converted into free memory regions. Also, after performing the garbage collection operation, the memory management unit 110 may initialize the accumulated size information.

The candidate memory regions 111 selected for the wear leveling operation may not be processed by the garbage collection operation all at once. A single garbage collection operation is performed to a number of the candidate memory regions 111, where the number is equal to or less than the adjustment value 112, each time the management condition is satisfied. The adjustment value 112 may be proportional to the number of candidate memory regions 111, and accordingly, be proportional to the ratio of memory regions which are worn out slightly. In the case where the wear leveling operation is performed in this way, the overhead of the controller 100 may be reduced and the operation efficiency of the controller 100 may be improved.

The storage medium 500 may store data transmitted from the controller 100 and may read stored data and transmit read data to the controller 100, according to control of the controller 100. The storage medium 500 may include one or more nonvolatile memory devices. The nonvolatile memory devices may include a flash memory, such as a NAND flash or a NOR flash, a Ferroelectric Random Access Memory (FeRAM), a Phase-Change Random Access Memory (PCRAM), a Magnetoresistive Random Access Memory (MRAM), a Resistive Random Access Memory (ReRAM), and the like.

The storage medium 500 may include the plurality of memory regions MR0 to MRn. The plurality of memory regions MR0 to MRn may be included in one nonvolatile memory device. According to an embodiment, the plurality of memory regions MR0 to MRn may be included in a plurality of nonvolatile memory devices.

Figure 2:
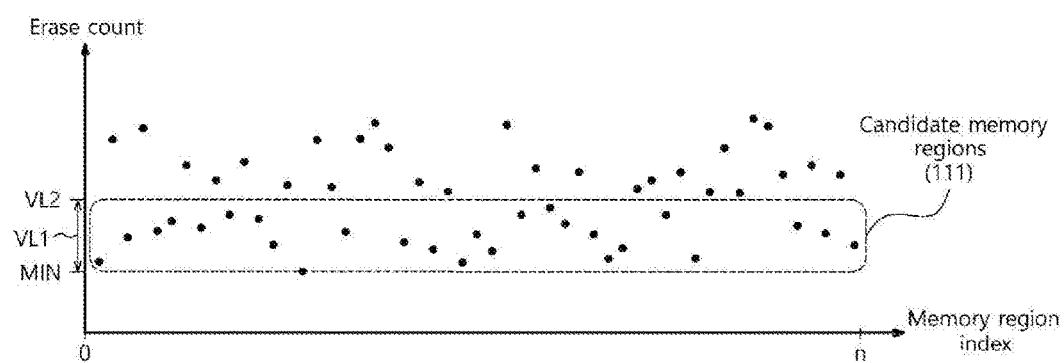
FIG. 2 is a graph illustrating points corresponding to memory regions, which also illustrates selecting candidate memory regions based on erase counts of a plurality of memory regions, by a memory management unit employed by the data storage device of FIG. 1.

FIG. 2 is a graph illustrating selection of candidate memory regions 111 based on erase counts of the plurality of memory regions MR0 to MRn, by the memory management unit 110 of FIG. 1. In the graph of FIG. 2, the horizontal axis represents the indexes of the plurality of memory regions MR0 to MRn, and the vertical axis represents the erase counts of the plurality of memory regions MR0 to MRn. Therefore, in the graph of FIG. 2, points may respectively correspond to the memory regions MR0 to MRn.

Referring to FIG. 2, the memory management unit 110 may select the candidate memory regions 111 for the wear leveling operation based on the erase counts of the plurality of memory regions MR0 to MRn. The memory management unit 110 may select as the candidate memory regions 111 memory regions, which have erase counts smaller than a second value VL2 that is obtained by adding a first value VL1 to a minimum erase count MIN among the erase counts of the plurality of memory regions MR0 to MRn. Accordingly, memory regions which are worn out slightly among the plurality of memory regions MR0 to MRn may be selected as the candidate memory regions 111.

The first value VL1 may be set to an appropriate value depending on operation circumstances and the overhead of the controller 100. Namely, when the first value VL1 is large, a larger number of candidate memory regions 111 are selected at a time, and the state changes of memory regions according to the lapse of time may not be reflected well. Conversely, when the first value VL1 is small, a process for selecting candidate memory regions 111 is performed frequently, and the overhead of the controller 100 may be increased.

A different number of candidate memory regions 111 may be selected according to the above-described method each time when selecting the candidate memory regions 111 while using the storage medium 500. The memory management unit 110 may determine the adjustment value 112 based on the number of selected candidate memory regions 111. The memory management unit 110 may determine the adjustment value 112 based on the following equation.

Adjustment value=(the number of candidate memory regions 111/the number of entire memory regions $MR0$ to $MRn$)*p The value of "p" may be set to an appropriate value depending on operation circumstances and the overhead of the controller 100. That is to say, if the value of "p" is too great, since a very large number of victim memory regions are processed each time the management condition is satisfied, the overhead of the controller 100 may be increased. Conversely, if the value of "p" is too small, a wear leveling efficiency may deteriorate.

Figure 3:
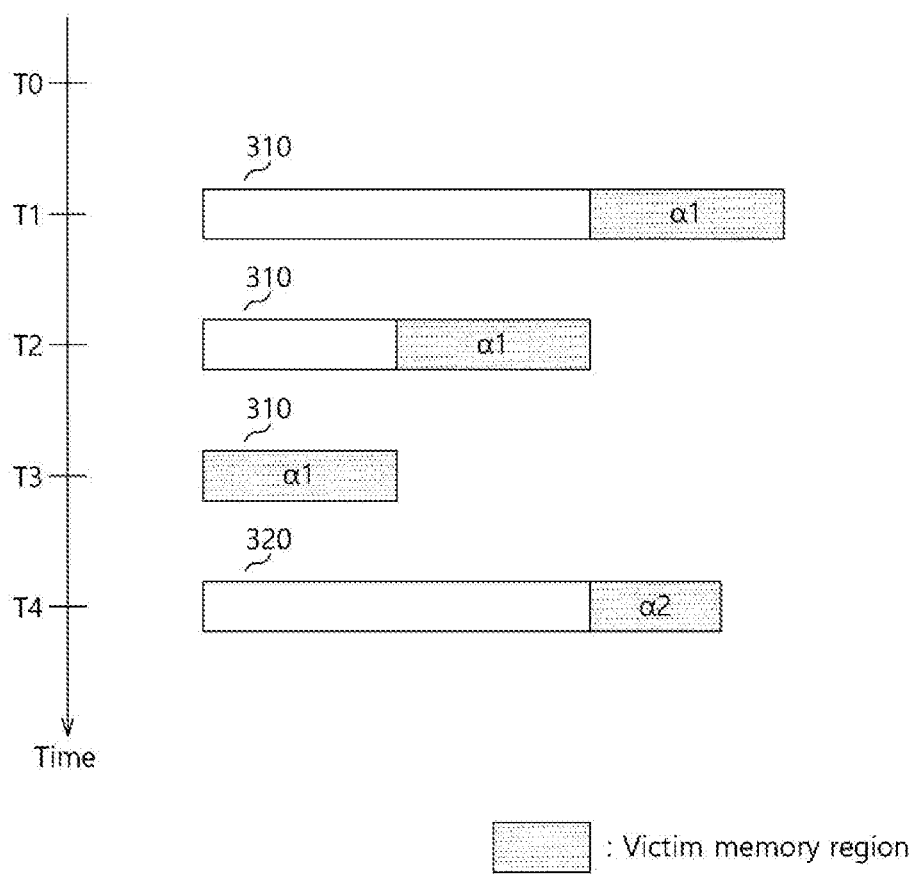
FIG. 3 is diagram illustrating performance of a wear leveling operation of the memory management unit employed by the data storage device of FIG. 1 including determining candidate memory regions at various times.

FIG. 3 is diagram illustrating performance of wear leveling operation, including determining candidate memory regions at various times.

At a time T1, the memory management unit 110 may determine that a management condition is satisfied, for example that the size of the write data accumulated from a time T0 to time T1 has reached a threshold size. The memory management unit 110 may then determine that selected candidate memory regions 111 do not exist by referring to the information indicating the candidate memory regions among the plurality of memory regions MR0 to MRn included in the storage medium 500, and select candidate memory regions 310 among the plurality of memory regions MR0 to MRn as described above with reference to FIG. 2. The length of a bar representing the candidate memory regions 310 may be proportional to the number of candidate memory regions 310, and accordingly, a subsequent change in the length of the bar may mean a change in the number of candidate memory regions 310. The memory management unit 110 may determine an adjustment value α1 based on the ratio of the candidate memory regions 310 with respect to the plurality of memory regions MR0 to MRn. The memory management unit 110 may randomly select a number of victim memory regions equal to or less than the adjustment value α1 among the candidate memory regions 310, and perform the garbage collection operation to the victim memory regions. The memory management unit 110 may remove the garbage-collected victim memory regions from the candidate memory regions 310.

At a time T2, the memory management unit 110 may is determine that the size of the write data accumulated from the time T1 reaches the threshold size. The memory management unit 110 may then randomly select a number of victim memory regions equal to or less than the adjustment value α1 determined at the time T1 among the remaining candidate memory regions 310, and perform the garbage collection operation on the victim memory regions. The memory management unit 110 may remove the garbage-collected victim memory regions from the candidate memory regions 310.

At a time T3, the memory management unit 110 may determine that the size of the write data accumulated from the time T2 reaches the threshold size. The memory management unit 110 may select a number of victim memory regions equal to or less than the previously determined adjustment value α1 among the remaining candidate memory regions 310, and perform the garbage collection operation on the selected victim memory regions. The memory management unit 110 may remove the garbage-collected victim memory regions from the candidate memory regions 310.

At a time T4, the memory management unit 110 may determine that the size of the write data accumulated from the time T3 reaches the threshold size. The memory management unit 110 may determine that the candidate memory regions 310 do not exist anymore by referring to the information indicating the candidate memory regions among the plurality of memory regions MR0 to MRn included in the storage medium 500, and may select new candidate memory regions 320. The memory management unit 110 may newly is determine an adjustment value α2 based on the ratio of the candidate memory regions 320 with respect to the plurality of memory regions MR0 to MRn. For example, the number of candidate memory regions 320 selected at time T4 may be smaller than the number of candidate memory regions 310 selected at time T1, and resultantly, the adjustment value α2 may be determined to be smaller at time T4. The memory management unit 110 may randomly select a number of victim memory regions equal to or less than the adjustment value α2 among the candidate memory regions 320, and perform the garbage collection operation on the selected victim memory regions. The memory management unit 110 may remove the garbage-collected victim memory regions from the candidate memory regions 320.

Figure 4:
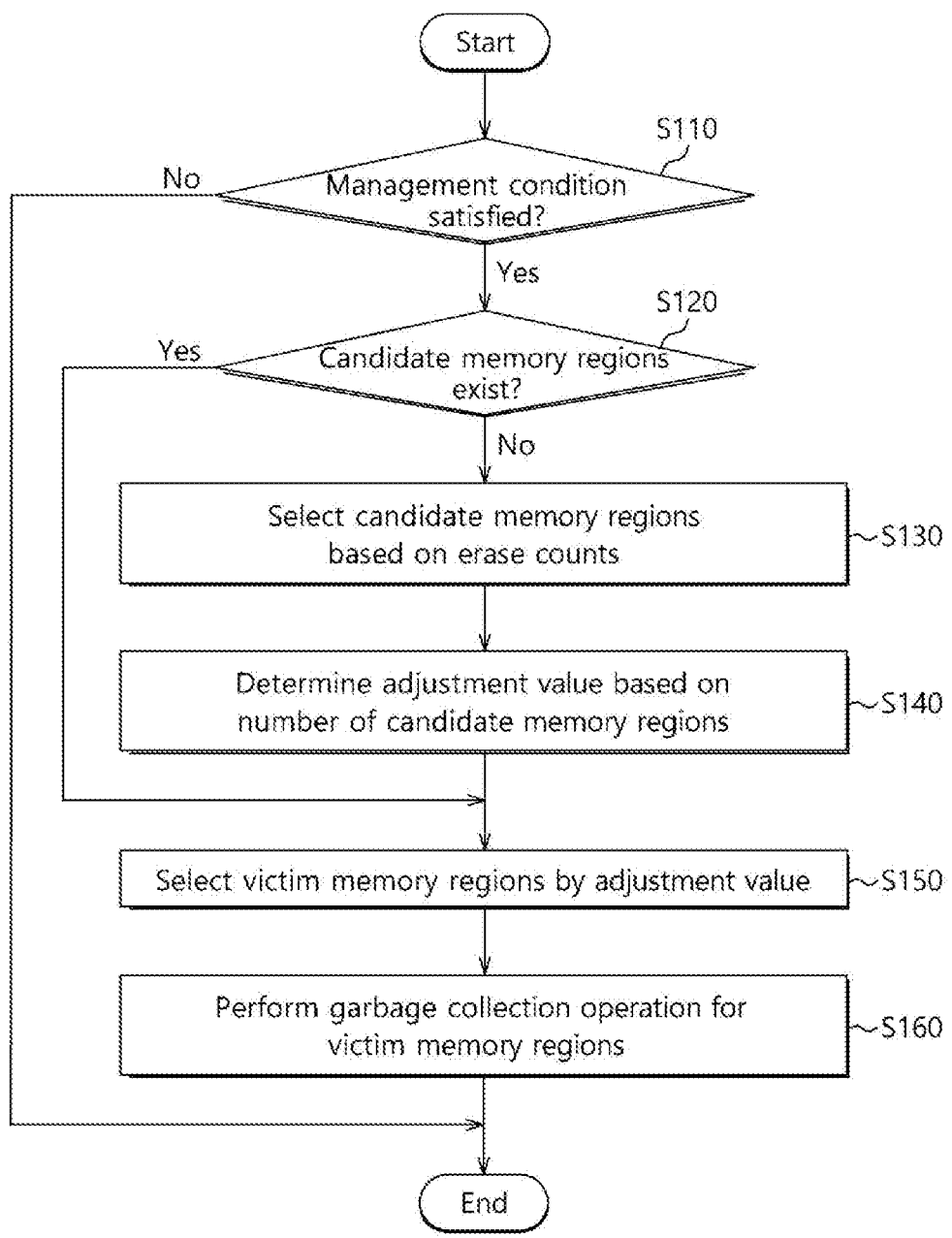
FIG. 4 is flowchart illustrating a method for operating the data is storage device of FIG. 1.

FIG. 4 is a flowchart illustrating a method for operating the data storage device 10 of FIG. 1.

Referring to FIG. 4, at step S110, the memory management unit 110 may determine whether a management condition is satisfied. For example, the memory management unit 110 may manage information of the accumulated size of write data. The memory management unit 110 may update the accumulated size information each time a write request is received from an external device, and determine whether the size of the accumulated write data reaches the threshold size. When the management condition is not satisfied, the process may be ended. When the management condition is satisfied, the process may proceed to step S120.

At step S120, the memory management unit 110 may is determine whether there exist candidate memory regions 111 by referring to the information indicating the candidate memory regions among the plurality of memory regions MR0 to MRn included in the storage medium 500. In other words, the memory management unit 110 may determine whether there exist candidate memory regions 111 which were selected previously and are not garbage-collected yet. When candidate memory regions 111 exist, the process may proceed to step S150. If candidate memory regions 111 exist, the adjustment value 112 may have been already determined when candidate memory regions 111 are selected, and at step S150, victim memory regions may be selected according to the corresponding adjustment value 112. However, when candidate memory regions 111 do not exist, the process may proceed to step S130.

At step S130, the memory management unit 110 may select one or more candidate memory regions 111 based on the erase counts of the plurality of memory regions MR0 to MRn. For example, the memory management unit 110 may select as the candidate memory regions 111, memory regions, which have erase counts smaller than a second value that is obtained by adding a first value to a minimum erase count among erase counts as described earlier with reference to FIG. 2.

At step S140, the memory management unit 110 may determine the adjustment value 112 based on the number of candidate memory regions 111. The adjustment value 112 may be determined to be proportional to the ratio of the candidate memory regions 111 is with respect to the plurality of memory regions MR0 to MRn. The determined adjustment value 112 may be retained until all the candidate memory regions 111 selected at step S130 are garbage-collected.

At step S150, the memory management unit 110 may select a number of victim memory regions which may be determined by the adjustment value 112 among the candidate memory regions 111. For example, the number of selected victim memory regions may be equal to the adjustment value 112. Importantly, by randomly selecting victim memory regions among the candidate memory regions 111, a wear leveling effect may be maximized.

At step S160, the memory management unit 110 may perform the garbage collection operation for the selected victim memory regions. The memory management unit 110 may move valid data stored in the victim memory regions to free memory regions among the plurality of memory regions MR0 to MRn, and empty the victim memory regions into free memory regions. The memory management unit 110 may remove the garbage-collected victim memory regions from the candidate memory regions 111.

The process shown in FIG. 4 may be performed repeatedly.

Figure 5:
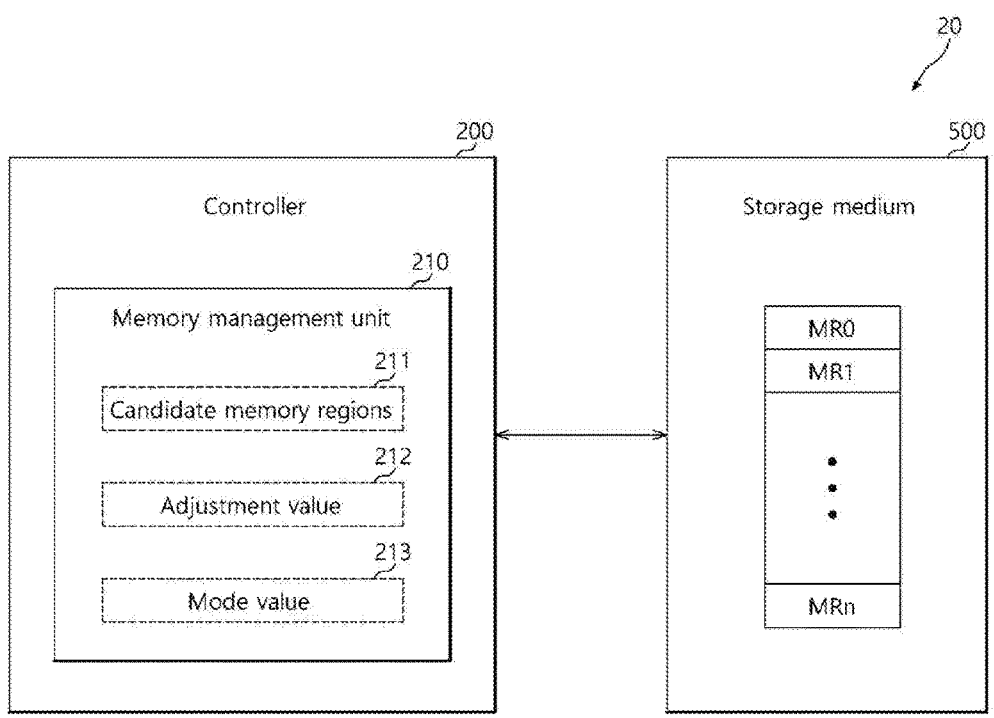
FIG. 5 is a block diagram illustrating a data storage device in accordance with another embodiment of the present invention.

FIG. 5 is a block diagram illustrating a data storage device 20 in accordance with an embodiment of the present invention.

The data storage device 20 may include a controller 200 and a storage medium 500. The controller 200 may include a memory management unit 210.

Using the same method as the memory management unit 110 of FIG. 1, the memory management unit 210 may select candidate memory regions 211 based on the erase counts of a plurality of memory regions MR0 to MRn. Also, using the same method as the memory management unit 110 of FIG. 1, the memory management unit 210 may determine an adjustment value 212 based on the number of selected candidate memory regions 211. However, the memory management unit 210 may select victim memory regions among the candidate memory regions 211 based on not only the adjustment value 212 but also a mode value 213. Namely, the memory management unit 210 may select victim memory regions among the candidate memory regions 211 according to the sum of the adjustment value 212 and the mode value 213.

The memory management unit 210 may determine the mode value 213 based on the number of free memory regions among the plurality of memory regions MR0 to MRn. The mode value 213 may correspond to a selected one among a plurality of modes of a management operation depending on the number of free memory regions. As a mode corresponds to a larger number of free memory regions, the mode may correspond to a larger mode value 213. The mode value 213 may be determined according to a mode selected among a plurality of modes of a management operation depending on the number of free memory regions each time a wear leveling operation is performed as the management condition is satisfied.

That is to say, since slightly worn out victim memory regions is have a relatively larger amount of valid data, a garbage collection operation to such slightly worn out victim memory regions may increase the overhead of the controller 200. Therefore, when the number of free memory regions is large, the garbage collection operation may be performed to a large number of victim memory regions thereby dispersing the overhead of the controller 200.

Meanwhile, the modes of the wear leveling operation may correspond to different management conditions. For example, a threshold size to be compared with the accumulated size of write data may be set differently depending on a mode. For example, among a plurality of modes, as a mode corresponds to a larger number of free memory regions, the mode may correspond to a larger threshold size. Therefore, since the wear leveling operation is performed with a long interval as the number of free memory regions is large, the overhead of the controller 200 may be adjusted.

FIG. 6 is a table illustrating modes MODE1 to MODE3 of the wear leveling operation of the memory management unit 210 of FIG. 5.

Referring to FIG. 6, the wear leveling operation may be performed in any one operational mode MODE1 to MODE3 depending on a mode condition, for example, the number "f" of free memory regions. The modes MODE1 to MODE3 correspond to mode values m1 to m3, respectively, and a larger number "f" of free memory regions may correspond to a larger mode value. The memory management unit 210 may select the mode value of a mode that is determined is depending on the number "f" of free memory regions. Meanwhile, an adjustment value "α" determined depending on the number of candidate memory regions 211 may be retained regardless of mode until all the candidate memory regions 211 are garbage-collected.

The modes MODE1 to MODE3 correspond to threshold sizes s1 to s3, respectively, and a larger number "f" of free memory regions may correspond to a larger threshold size.

Thus, for example, when the number "f" of free memory regions is included between values f2 and f1, the memory management unit 210 may select the mode MODE2, and select a number of victim memory regions among the candidate memory regions 211 that is equal to or less than the sum of the adjustment value "α" and the mode value m2. After the garbage collection operation is performed on the selected victim memory regions, it may be determined whether a management condition for a next wear leveling operation is satisfied based on the threshold size s2 corresponding to the mode MODE2.

According to an embodiment, the modes MODE1 to MODE3 may be distinguished depending on not the number "f" of free memory regions but the ratio of free memory regions with respect to the entire memory regions MR0 to MRn.

While FIG. 6 shows the case where the wear leveling operation is performed in the 3 modes MODE1 to MODE3, it is to be noted that the number of modes is not limited thereto.

FIG. 7 is diagram illustrating performance, by the memory management unit 210 of FIG. 5, of a wear leveling operation based on the table of FIG. 6, including illustration of candidate memory regions and victim memory regions for different modes at various times.

At a time T11, the memory management unit 210 may determine that a management condition is satisfied, for example, the size of the write data accumulated from a time T0 reaches a preset threshold size. The memory management unit 210 may determine that selected candidate memory regions do not exist by referring to the information indicating the candidate memory regions among the plurality of memory regions MR0 to MRn included in the storage medium 500, and select candidate memory regions 710 among the plurality of memory regions MR0 to MRn as described above with reference to FIG. 2. The memory management unit 210 may determine an adjustment value α1 based on the ratio of the candidate memory regions 710 with respect to the plurality of memory regions MR0 to MRn. The memory management unit 210 may determine the MODE1 and the mode value m1 corresponding to the mode MODE1 based on the number "f" of free memory regions. The memory management unit 210 may select victim memory regions by the number that is equal to or less than the sum of the adjustment value α1 and the mode value m1 among the candidate memory regions 710, and perform the garbage collection operation on the selected victim memory regions. The memory management unit 210 may remove the garbage-collected victim memory regions from the candidate memory regions 710. The memory management unit 210 may set the threshold size s1 corresponding to the mode MODE1 as a new management condition.

At a time T12, the memory management unit 210 may determine that the size of the write data accumulated from time T11 reaches the threshold size s1. The memory management unit 210 may determine the MODE2 and the mode value m2 corresponding to the mode MODE2 based on the number "f" of free memory regions. The memory management unit 210 may select a number of victim memory regions that is equal to or less than the sum of the adjustment value α1 determined at time T11 and the mode value m2 among the remaining candidate memory regions 710, and perform the garbage collection operation on the selected victim memory regions. The memory management unit 210 may remove the garbage-collected victim memory regions from the candidate memory regions 710. The memory management unit 210 may set the threshold size s2 corresponding to the mode MODE2 as a new management condition.

Figure 8:
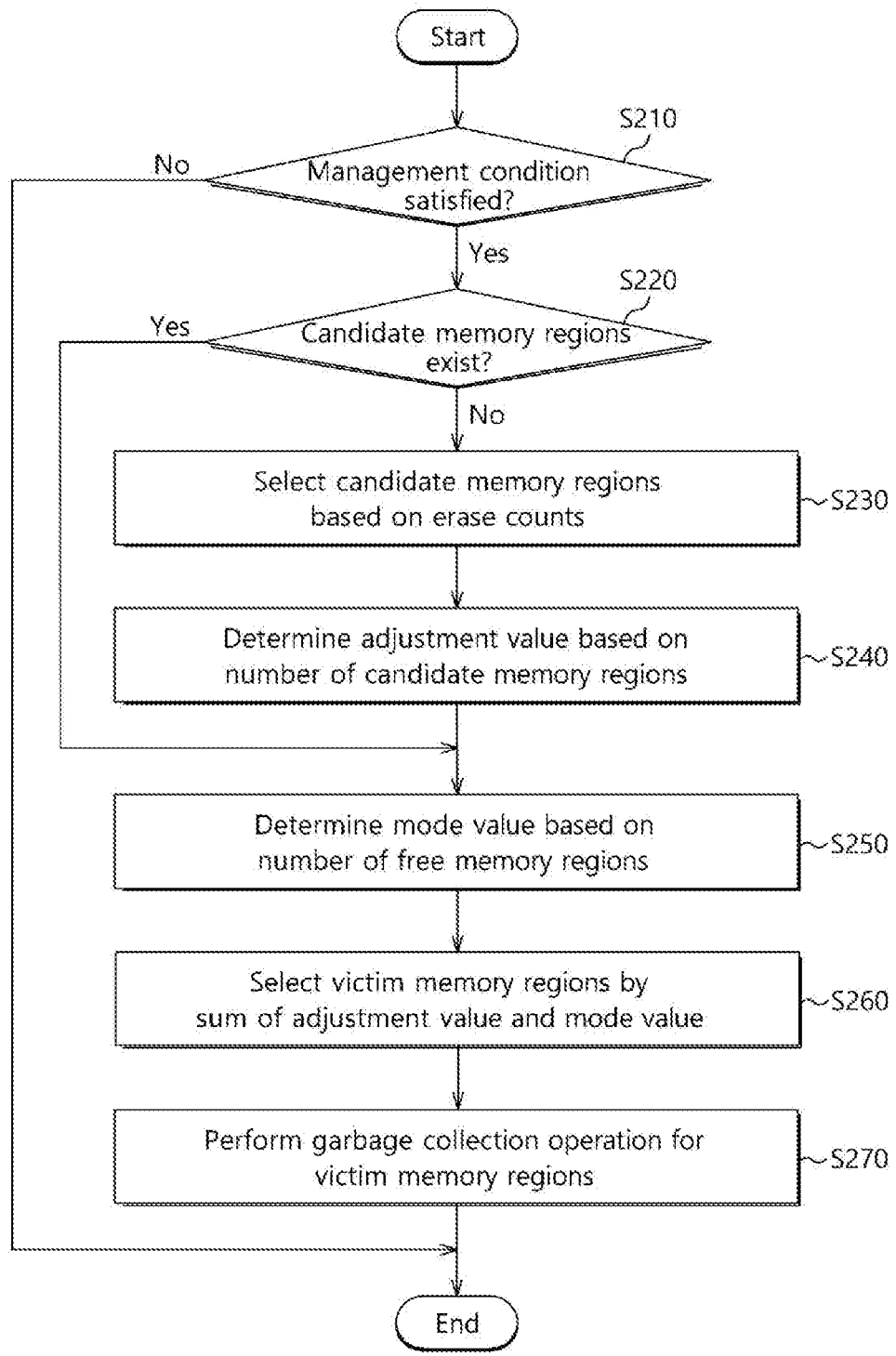
FIG. 8 is flowchart illustrating a method for operating the data storage device of FIG. 5.

FIG. 8 is flowchart illustrating a method for operating the data storage device 20 of FIG. 5. Hereinbelow, the method for operating the data storage device 20 will be described with reference to FIGS. 5, 6 and 8.

Referring to FIG. 8, steps S210 to S240 may be substantially the same as the steps S110 to S140 of FIG. 4.

At step S250, the memory management unit 210 may determine the mode value 213 based on the number "f" of free memory regions. The mode value 213 may be the mode value of a mode that corresponds to the number "f" of free memory regions, among the is plurality of modes. As a mode corresponds to a larger number "f" of free memory regions, the mode may correspond to a larger mode value.

At step S260, the memory management unit 210 may select a number of victim memory regions that is equal to or less than the sum of the adjustment value 212 and the mode value 213 among the candidate memory regions 211.

Step S270 may be substantially the same as the step S160 of FIG. 4.

Figures 9, 10:
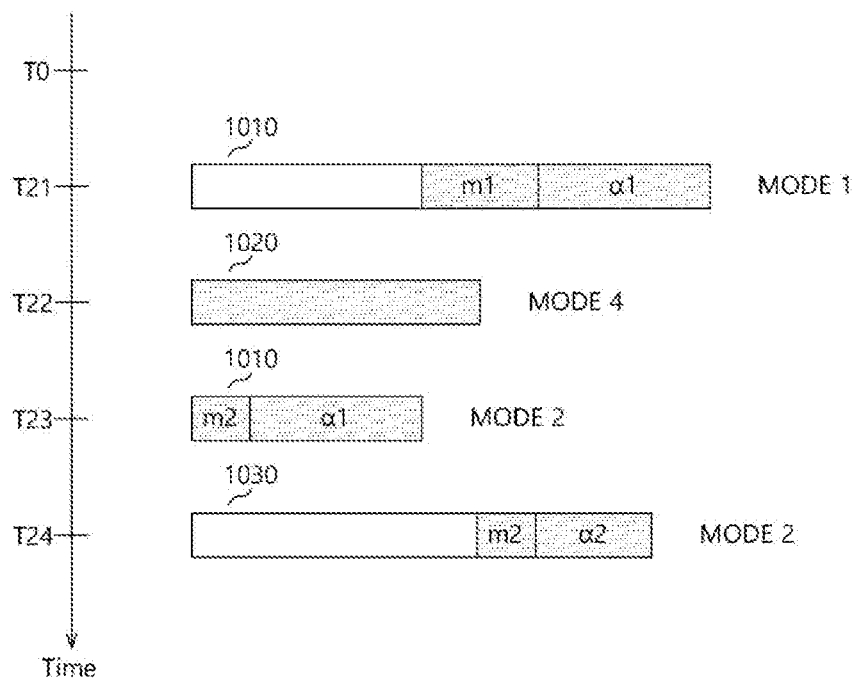
FIG. 9 is a table illustrating modes of the wear leveling operation and a memory collection operation of the memory management unit employed by the data storage device of FIG. 5.
FIG. 10 is diagram illustrating performance of a wear leveling operation and the memory collection operation of the memory management unit employed by the data storage device of FIG. 5 based on the table of FIG. 9, including illustration of candidate memory regions and victim memory regions for different modes at various times.

FIG. 9 is a table illustrating modes MODE1 to MODE4 of the wear leveling operation and a memory securement collection operation of the memory management unit 210 of FIG. 5.

According to an embodiment, the memory management unit 210 may preferentially perform a memory securement collection operation of securing (obtaining) free memory regions more efficiently than a wear leveling operation based on the number of free memory regions when a management condition is satisfied. Namely, the memory management unit 210 may select victim memory regions among the plurality of memory regions MR0 to MRn, instead of among the candidate memory regions 211, depending on the amounts of valid data of the plurality of memory regions MR0 to MRn and the number of free memory regions when a management condition is satisfied.

The memory management unit 210 may determine to perform the memory collection operation instead of the wear leveling operation, when, for example, the number of free memory regions is smaller than a threshold number. When performing the memory collection operation, the memory management unit 210 may select, as victim memory regions, memory regions which have small amounts of valid data among the plurality of memory regions MR0 to MRn. The memory management unit 210 may perform a garbage collection operation to the selected victim memory regions. That is to say, when the memory management unit 210 is determined to perform the memory collection operation rather than the wear leveling operation, victim memory regions may be selected based on the amounts of valid data in order to minimize a garbage collection cost.

According to an embodiment, the memory management unit 210 may determine whether to perform the memory collection operation preferentially instead of the wear leveling operation based on the ratio of free memory regions with respect to all of the memory regions instead of the number of free memory regions. In other words, the memory management unit 210 may determine to perform the memory collection operation when the ratio of the free memory regions with respect to all of the memory regions is smaller than a threshold rate.

Accordingly, referring to FIG. 9, a memory management operation, for example, the wear leveling operation and the memory collection operation, may be performed in any one mode of the modes MODE1 to MODE4 depending on a mode condition, for example, the number "f" of free memory regions. The memory collection operation is performed in the mode MODE4 when the number "f" of free memory regions is smaller than a threshold number f3, and the wear leveling is operation may be performed in any one of the modes MODE1 to MODE3 when the number "f" of free memory regions is equal to or larger than the threshold number f3. The method of performing the wear leveling operation in the modes MODE1 to MODE3 may be the same as the method described above with reference to FIGS. 6 to 8. In the mode MODE4, the memory management unit 210 may not select victim memory regions from the candidate memory regions 211 which are selected for the wear leveling operation, but may select, as victim memory regions, memory regions which have small amounts of valid data among the plurality of memory regions MR0 to MRn.

According to an embodiment, the number of victim memory regions selected in the mode MODE4 may not be limited. The memory management unit 210 may perform the garbage collection operation to many victim memory regions as possible until a predetermined time passes from when the memory collection operation is started.

While FIG. 9 shows an example where the wear leveling operation is performed in three modes (e.g., MODE1, MODE2, and MODE3) and the memory collection operation is performed in one mode (e.g., MODE4), it is to be noted that the invention is not limited in this way and that the numbers of modes for the wear leveling operation and the memory collection operation may vary.

FIG. 10 is diagram illustrating performance, by the memory management unit 210 of FIG. 5, of a wear leveling operation and the memory collection operation based on the table of FIG. 9, including illustration of candidate memory regions and victim memory regions is for different modes at various times.

At a time T21, the memory management unit 210 may determine that a management condition is satisfied, for example, the size of the write data accumulated from a time T0 reaches a preset threshold size. The memory management unit 210 may determine the mode MODE1 based on the number of free memory regions that is equal to or larger than the threshold number f3, and determine to perform the wear leveling operation. The memory management unit 210 may determine that selected candidate memory regions do not exist by referring to the information indicating the candidate memory regions among the plurality of memory regions MR0 to MRn included in the storage medium 500, and select candidate memory regions 1010 among the plurality of memory regions MR0 to MRn as described above with reference to FIG. 2. The memory management unit 210 may determine an adjustment value α1 based on the ratio of the candidate memory regions 1010 with respect to the plurality of memory regions MR0 to MRn. The memory management unit 210 may select a number of victim memory regions that is equal to or less than the sum of the adjustment value α1 and a mode value m1 corresponding to the mode MODE1 among the candidate memory regions 1010, and perform the garbage collection operation on the selected victim memory regions. The memory management unit 210 may remove the garbage-collected victim memory regions from the candidate memory regions 1010. The memory management unit 210 may set a threshold size s1 corresponding to the mode MODE1 as a new management condition.

At a time T22, the memory management unit 210 may determine that the size of the write data accumulated from the time T21 reaches the threshold size. The memory management unit 210 may determine the mode MODE4 based on the number of free memory regions that is smaller than the threshold number f3, and determine to perform the memory collection operation. Therefore, the memory management unit 210 may select victim memory regions 1020 not from the candidate memory regions 1010, but from the plurality of memory regions MR0 to MRn based on the amounts of valid data, and perform the garbage collection operation on the selected victim memory regions 1020 for a predetermined time. The memory management unit 210 may set a threshold size s4 corresponding to the mode MODE4 as a new management condition.

At a time T23, the memory management unit 210 may determine that the size of the write data accumulated from the time T22 reaches the threshold size. The memory management unit 210 may determine the mode MODE2 based on the number of free memory regions that is equal to or larger than the threshold number f3, and determine to perform the wear leveling operation. Accordingly, the memory management unit 210 may select victim memory regions by the number that is equal to or less than the sum of the adjustment value α1 determined at the time T21 and a mode value m2 corresponding to the mode MODE2 among the remaining candidate memory regions 1010, and perform the garbage collection operation on the victim memory regions. The memory management unit 210 is may remove the garbage-collected victim memory regions from the candidate memory regions 1010. The memory management unit 210 may set a threshold size s2 corresponding to the mode MODE2 as a new management condition.

At a time T24, the memory management unit 210 may determine that the size of the write data accumulated from the time T23 reaches the threshold size. The memory management unit 210 may determine the mode MODE2 based on the number of free memory regions that is equal to or larger than the threshold number f3, and determine to perform the wear leveling operation. The memory management unit 210 may determine that the candidate memory regions 1010 do not exist anymore, and select new candidate memory regions 1030. The memory management unit 210 may newly determine an adjustment value α2 based on the ratio of the candidate memory regions 1030 with respect to the plurality of memory regions MR0 to MRn. Accordingly, the memory management unit 210 may select victim memory regions by the number that is equal to or less than the sum of the adjustment value α2 and the mode value m2 corresponding to the mode MODE2 among the candidate memory regions 1030, and perform the garbage collection operation to the selected victim memory regions. The memory management unit 210 may remove the garbage-collected victim memory regions from the candidate memory regions 1030. The memory management unit 210 may set the threshold size s2 corresponding to the mode MODE2 as a new management condition.

Figure 11:
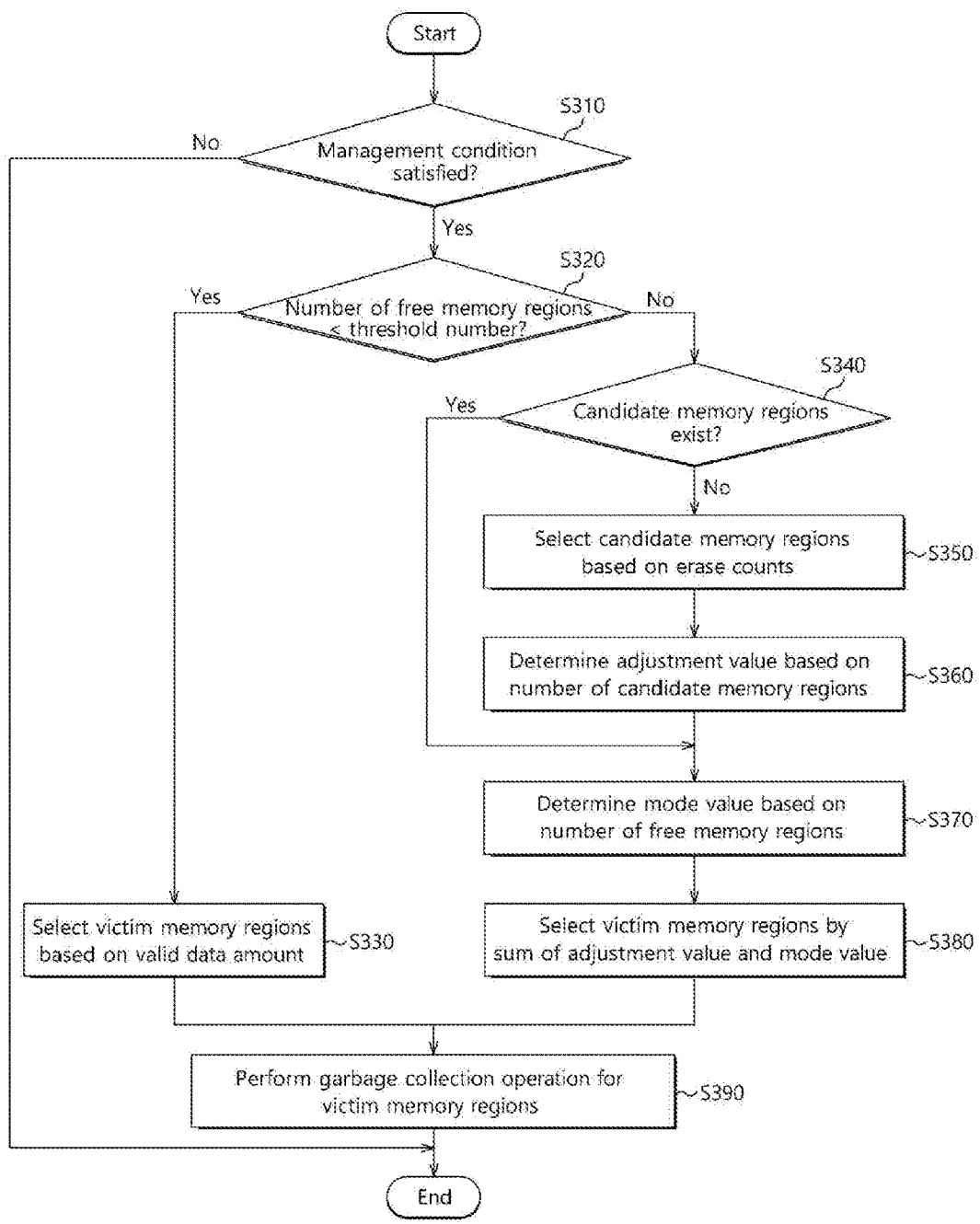
FIG. 11 is flowchart illustrating another method for operating the data storage device of FIG. 5.

FIG. 11 is a flowchart illustrating a method for operating the data storage device 20 of FIG. 5. Hereinbelow, the method for operating the data storage device 20 will be described with reference to FIGS. 5, 9 and 11.

Referring to FIG. 11, step S310 may be substantially the same as the step S210 of FIG. 8.

At step S320, the memory management unit 210 may determine whether the number "f" of free memory regions is smaller than a threshold number. When the number "f" of free memory regions is smaller than the threshold number, the process may proceed to step S330 for the memory collection operation. When the number "f" of free memory regions is equal to or larger than the threshold number, the process may proceed to step S340 for the wear leveling operation.

At step S330, the memory management unit 210 may select victim memory regions from the plurality of memory regions MR0 to MRn based on the amounts of the valid data.

Steps S340 to S390 may be substantially the same as the steps S220 to S270 of FIG. 8.

FIG. 12 is a table illustrating modes MODE1 to MODE4 of the wear leveling operation and the memory collection operation of the memory management unit 210 of FIG. 5.

In the foregoing embodiments, when it is determined to perform a wear leveling operation and candidate memory regions 211 do not exist, the memory management unit 210 may select immediately new candidate memory regions 211. According to an embodiment, the memory management unit 210 may select candidate memory regions 211 each time a candidate selection condition is satisfied. Therefore, in the case where all candidate memory regions 211 are garbage-collected before the candidate selection condition is satisfied, the memory management unit 210 may perform a memory collection operation instead of a wear leveling operation. The candidate selection condition may be, for example, whether the accumulated size of write data reaches a preset threshold size, similarly to a management condition. The memory management unit 210 may determine the candidate selection condition after the management condition is satisfied. However, according to an embodiment, the memory management unit 210 may determine the candidate selection condition independently of the management condition.

Therefore, referring to FIG. 12, the modes MODE1 to MODE4 may be selected when the management condition is satisfied, and may be substantially similar to the modes MODE1 to MODE4 of FIG. 9. However, the mode MODE4 for the memory collection operation may be selected when candidate memory regions 211 do not exist although a new mode condition, for example, the candidate selection condition, is not satisfied yet.

FIG. 13 is diagram illustrating performance, by the memory management unit 210 of FIG. 5, of a wear leveling operation and the memory collection operation based on the table of FIG. 12, including illustration of candidate memory regions and victim memory regions is for different modes at various times.

The operation of the memory management unit 210 at times T31 to T33 may be the same as the operation of the memory management unit 210 at the times T21 to T23 of FIG. 10.

At a time T34, the memory management unit 210 may determine that the size of the write data accumulated from the time T33 reaches a threshold size s2 corresponding to the mode MODE2. Even though it may be determined that the number of free memory regions is equal to or larger than a threshold number f3 and the size of the write data accumulated from the time T31 does not reach a threshold size corresponding to the candidate selection condition, the memory management unit 210 may determine that candidate memory regions 1310 selected at the time T31 do not exist. Hence, the memory management unit 210 may determine to perform the memory collection operation. The memory management unit 210 may select victim memory regions 1330 from the plurality of memory regions MR0 to MRn based on the amounts of valid data, and perform a garbage collection operation on the victim memory regions 1330 for a predetermined time. The memory management unit 210 may set a threshold size s4 corresponding to the mode MODE4 as a new management condition.

At a time T35, the memory management unit 210 may determine that the size of the write data accumulated from the time T34 reaches the threshold size s4 corresponding to the mode MODE4. The memory management unit 210 may determine the mode MODE2 based on the number of free memory regions that is equal to or larger than the threshold number f3, and determine that the size of the write data accumulated from the time T31, at which the candidate memory regions 1310 are selected, reaches the threshold size corresponding to the candidate selection condition. Hence, the memory management unit 210 may select new candidate memory regions 1340. Since a method of the memory management unit 210 to perform the wear leveling operation thereafter is similar to the method described above, descriptions thereof will be omitted.

Figure 14:
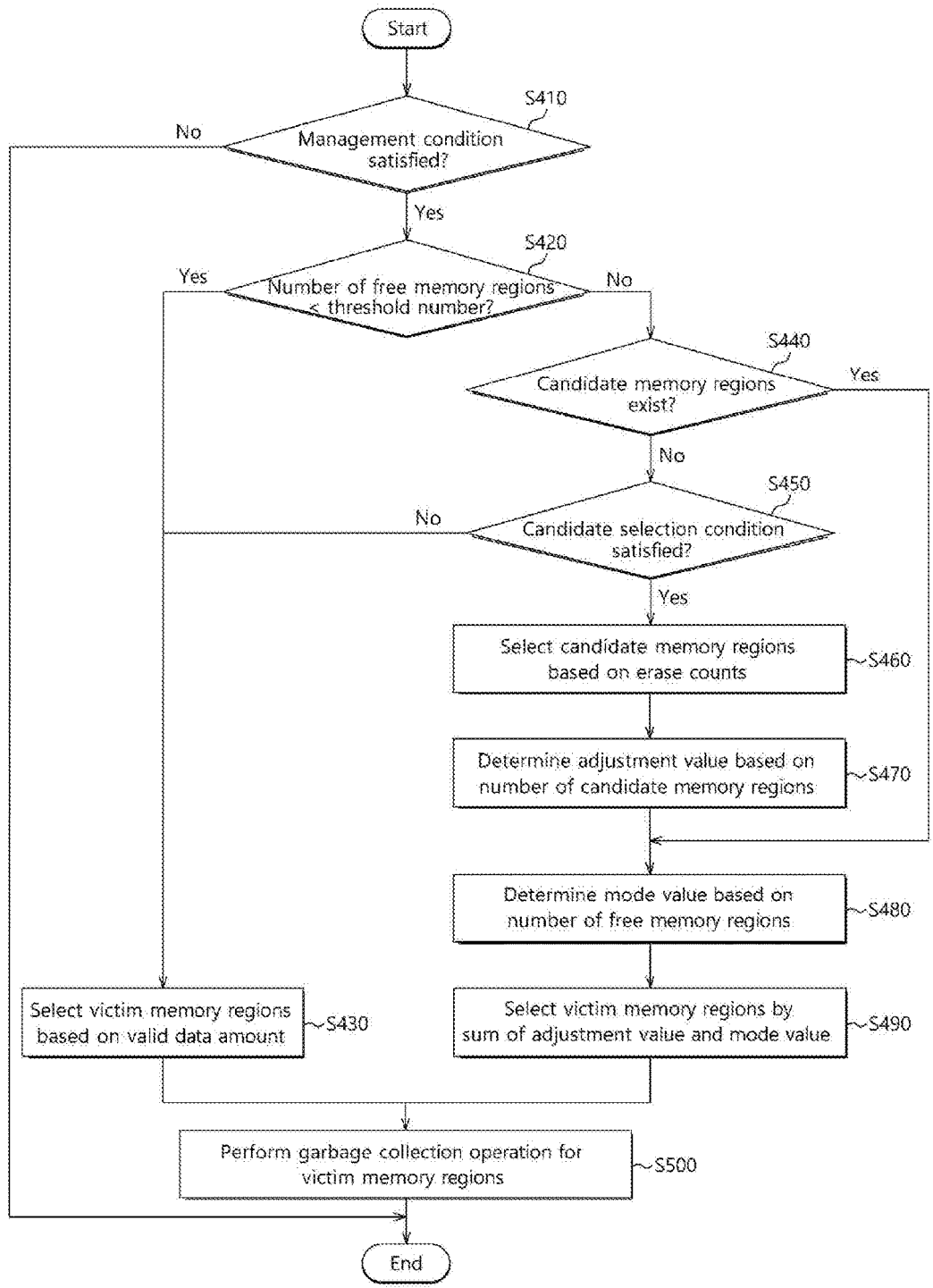
FIG. 14 is flowchart illustrating yet another method for operating the data storage device of FIG. 5.

FIG. 14 is a flowchart illustrating a method for operating the data storage device 20 of FIG. 5. Hereinbelow, the method for operating the data storage device 20 will be described with reference to FIGS. 5, 12 and 14.

Referring to FIG. 14, steps S410 to S440 may be substantially the same as the steps S310 to S340 of FIG. 11.

At step S450, the memory management unit 210 may determine whether the candidate selection condition is satisfied. For example, the memory management unit 210 may manage information of accumulated size of write data. The memory management unit 210 may update the accumulated size information each time a write request is received from an external device, and determine whether the size of accumulated write data reaches the threshold size corresponding to the candidate selection condition. When the candidate selection condition is satisfied, the process may proceed to step S460. When the candidate selection condition is not satisfied, the is process may proceed to step S430.

Steps S460 to S500 may be substantially the same as the steps S350 to S390 of FIG. 11.

Figure 15:
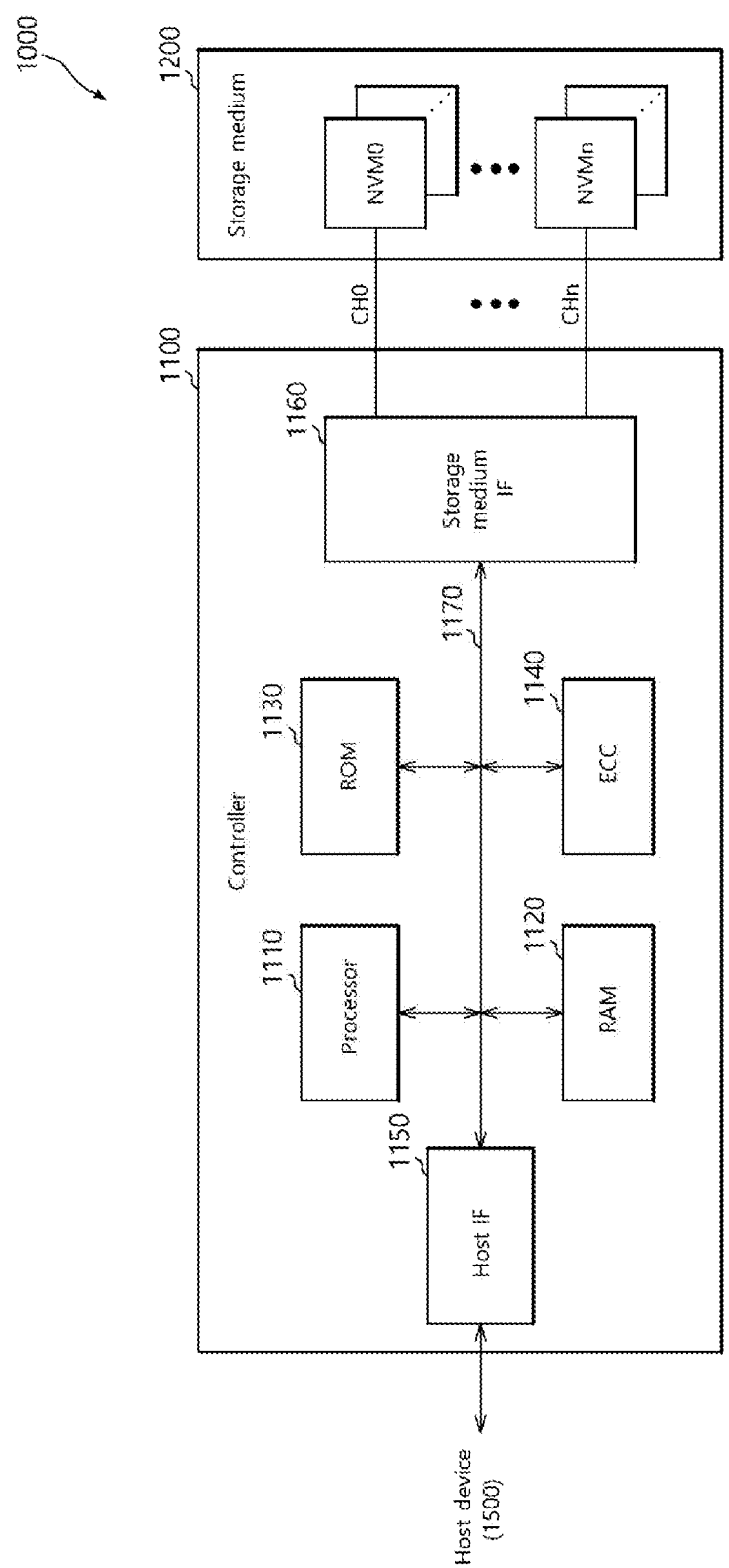
FIG. 15 is a block diagram illustrating a solid state drive (SSD) in accordance with an embodiment of the present invention.

FIG. 15 is a block diagram illustrating a solid state drive (SSD) 1000 in accordance with an embodiment of the present invention.

The SSD 1000 may include a controller 1100 and a storage medium 1200.

The controller 1100 may control data exchange between a host device 1500 and the storage medium 1200. The controller 1100 may include a processor 1110, a random access memory (RAM) 1120, a read only memory (ROM) 1130, an error correction code (ECC) unit 1140, a host interface 1150 and a storage medium interface 1160 which are coupled through an internal bus 1170.

The controller 1100 may operate substantially similarly to the controller 100 or 200 shown in FIG. 1 or 5.

The processor 1110 may control the general operations of the controller 1100. The processor 1110 may store data in the storage medium 1200 and read stored data from the storage medium 1200, according to data processing requests from the host device 1500. In order to efficiently manage the storage medium 1200, the processor 1110 may control internal operations of the SSD 1000 such as a merge operation, a wear leveling operation, and so forth.

The RAM 1120 may store programs and program data to be used by the processor 1110. The RAM 1120 may temporarily store data transmitted from the host interface 1150 before transferring it to is the storage medium 1200, and may temporarily store data transmitted from the storage medium 1200 before transferring it to the host device 1500.

The ROM 1130 may store program codes to be read by the processor 1110. The program codes may include commands to be processed by the processor 1110, for the processor 1110 to control the internal units of the controller 1100.

The ECC unit 1140 may encode data to be stored in the storage medium 1200, and may decode data read from the storage medium 1200. The ECC unit 1140 may detect and correct an error occurred in data, according to an ECC algorithm.

The host interface 1150 may exchange data processing requests, data, etc. with the host device 1500.

The storage medium interface 1160 may transmit control signals and data to the storage medium 1200. The storage medium interface 1160 may be transmitted with data from the storage medium 1200. The storage medium interface 1160 may be coupled with the storage medium 1200 through a plurality of channels CH0 to CHn.

The storage medium 1200 may include the plurality of nonvolatile memory devices NVM0 to NVMn. Each of the plurality of nonvolatile memory devices NVM0 to NVMn may perform a write operation and a read operation according to control of the controller 1100.

Figure 16:
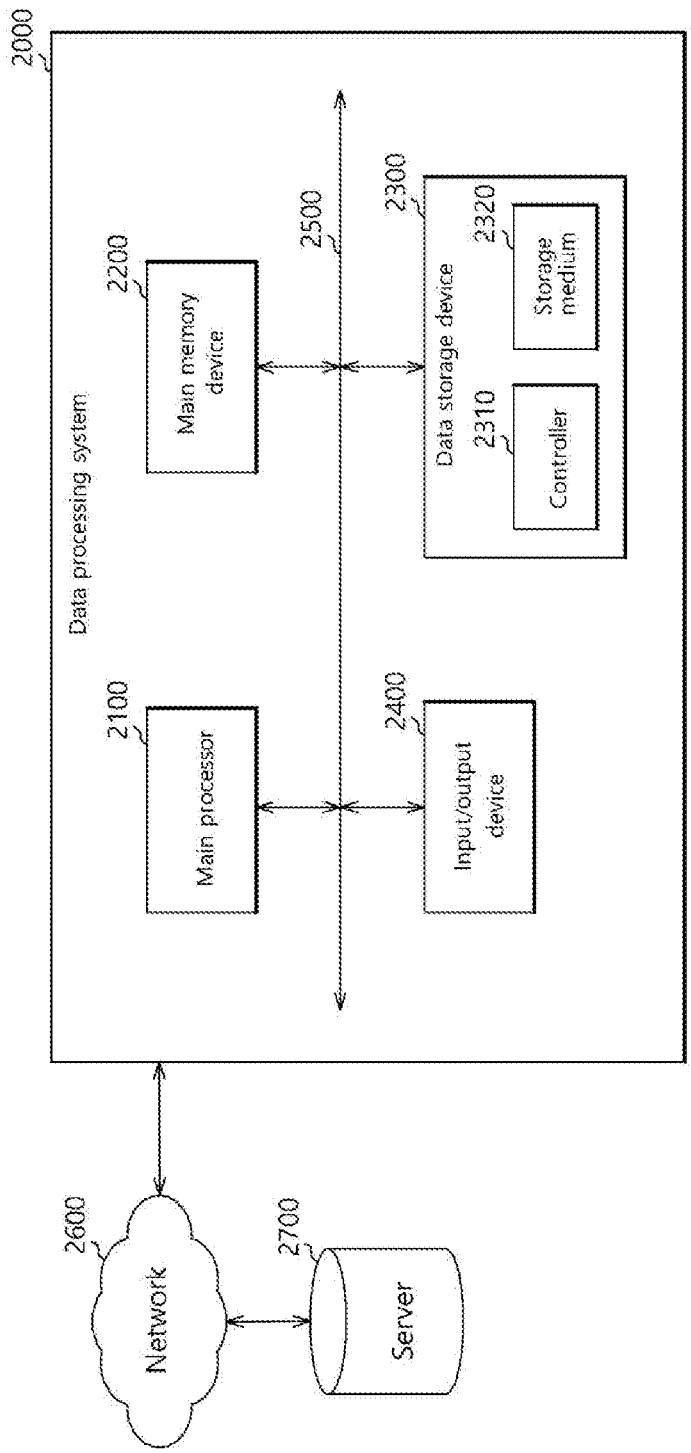
FIG. 16 is a block diagram illustrating a data processing system to which one or more data storage devices in accordance with an embodiment of the present invention are applied.

FIG. 16 is a block diagram illustrating a data processing system 2000 to which a data storage device 10 and/or 20 in accordance is with an embodiment may be applied.

The data processing system 2000 may include a computer, a laptop, a netbook, a smart phone, a digital TV, a digital camera, a navigator, etc. The data processing system 2000 may include a main processor 2100, a main memory device 2200, a data storage device 2300, and an input/output device 2400. The internal units of the data processing system 2000 may exchange data, control signals, etc. through a system bus 2500.

The main processor 2100 may control the general operations of the data processing system 2000. The main processor 2100 may be a central processing unit, for example, such as a microprocessor. The main processor 2100 may execute softwares such as an operation system, an application, a device driver, and so forth, on the main memory device 2200.

The main memory device 2200 may store programs and program data to be used by the main processor 2100. The main memory device 2200 may temporarily store data to be transmitted to the data storage device 2300 and the input/output device 2400.

The data storage device 2300 may include a controller 2310 and a storage medium 2320. The data storage device 2300 may be configured and operate substantially similarly to the data storage device 10 or 20 of FIG. 1 or 5.

The input/output device 2400 may include a keyboard, a scanner, a touch screen, a screen monitor, a printer, a mouse, or the like, capable of exchanging data with a user, such as receiving a command for controlling the data processing system 2000 from the user or providing a processed result to the user.

According to an embodiment, the data processing system 2000 may communicate with at least one server 2700 through a network 2600 such as a LAN (local area network), a WAN (wide area network), a wireless network, and so on. The data processing system 2000 may include a network interface (not shown) to access the network 2600.

While various embodiments have been described above, it will be understood to those skilled in the art that the embodiments described are examples only. Accordingly, the data storage device and the operating method thereof described herein should not be limited to the described embodiments. Many other embodiments and or variations thereof may be envisaged by those skilled in the art to which the present invention pertains without departing from the spirit and scope of the present invention.

What is claimed is:

1. A data storage device comprising:
   a memory device including a plurality of memory regions; and
   a controller configured to:
   select one or more candidate memory regions among the plurality of memory regions based on erase counts of the plurality of memory regions,
   determine an adjustment value such that the adjustment value is increasing proportionally to a ratio of the number of candidate memory regions with respect to the plurality of memory regions,
   select a number of victim memory regions among the one or more candidate memory regions, wherein the number of victim memory regions is equal to the adjustment value, and
   perform a garbage collection operation on the selected number of victim memory regions.

2. The data storage device according to claim 1, wherein the controller selects, as the one or more candidate memory regions, memory regions which have erase counts smaller than a second value that is obtained by adding a first value to a minimum erase count among the erase counts.

3. The data storage device according to claim 1,
   wherein the controller determines whether a management condition is satisfied by referring to an accumulated size of write data, and
   wherein the controller performs the garbage collection operation on a number of newly selected victim memory regions equal to or the adjustment value among the one or more candidate memory regions each time the management condition is satisfied.

4. The data storage device according to claim 3,
   wherein the controller determines whether candidate memory regions for which the garbage collection operation is not performed exist among the one or more candidate memory regions each time the management condition is satisfied, and
   wherein the controller newly selects at least one candidate memory region among the plurality of memory regions based on the erase counts depending on a result of the determination of whether candidate memory regions exist for which the garbage collection operation is not performed.

5. The data storage device according to claim 4,
   wherein the controller determines whether a candidate selection condition is satisfied when the candidate memory regions for which the garbage collection operation is not performed do not exist, and
   wherein the controller further selects victim memory regions among the plurality of memory regions, depending on amounts of valid data stored therein when the candidate selection condition is not satisfied.

6. The data storage device according to claim 1, wherein the controller further selects victim memory regions among the plurality of memory regions, depending on the amounts of the valid data stored therein and a number of free memory regions among the plurality of memory regions.

7. The data storage device according to claim 1, wherein the controller determines a mode value based on a number of free memory regions among the plurality of memory regions, and selects the number of victim memory regions to be equal to or less than a sum of the adjustment value and the mode value.

8. The data storage device according to claim 7,
   wherein the mode value corresponds to a mode among a plurality of modes that corresponds to the number of free memory regions, and
   wherein the mode value becomes larger as a corresponding mode corresponds to a larger number of free memory regions.

9. A method for operating a data storage device, comprising:
   selecting one or more candidate memory regions among a plurality of memory regions based on erase counts of the plurality of memory regions;
   determining an adjustment value such that the adjustment value is increasing proportionally to a ratio of the number of candidate memory regions with respect to the plurality of memory regions;
   selecting a number of victim memory regions among the one or more candidate memory regions, wherein the number of victim memory regions is equal to the adjustment value; and
   performing a garbage collection operation on the selected one or more number of victim memory regions.

10. The method according to claim 9, wherein the selecting of the one or more candidate memory regions comprises selecting, as the one or more candidate memory regions, memory regions which have erase counts smaller than a second value that is obtained by adding a first value to a minimum erase count among the erase counts.

11. The method according to claim 9, further comprising:
    determining whether a management condition is satisfied by referring to an accumulated size of write data; and
    performing the garbage collection operation on a number of newly selected victim memory regions equal to or less than the adjustment value among the one or more candidate memory regions each time the management condition is satisfied.

12. The method according to claim 11, further comprising:
    determining whether candidate memory regions for which the garbage collection operation is not performed exist among the one or more candidate memory regions each time the management condition is satisfied; and
    newly selecting one or more candidate memory regions among the plurality of memory regions based on the erase counts depending on a result of the determining of whether candidate memory regions exist for which the garbage collection operation is not performed.

13. The method according to claim 12, further comprising:
    determining whether a candidate selection condition is satisfied when the candidate memory regions for which the garbage collection operation is not performed do not exist; and selecting victim memory regions among the plurality of memory regions, depending on amounts of valid data stored therein when the candidate selection condition is not satisfied.

14. The method according to claim 9, further comprising selecting victim memory regions among the plurality of memory regions, depending on amounts of valid data stored therein and a number of free memory regions among the plurality of memory regions.

15. The method according to claim 9,
further comprising determining a mode value based on a number of free memory regions among the plurality of memory regions,
wherein the number of victim memory regions is selected to be equal to a sum of the adjustment value and the mode value.

16. The method according to claim 15,
wherein the mode value corresponds to a mode among a plurality of modes that corresponds to the number of free memory regions, and
wherein the mode value becomes larger as a corresponding mode corresponds to a larger number of free memory regions.

\* \* \* \* \*